US007809489B2

United States Patent
Koeller et al.

(10) Patent No.: US 7,809,489 B2
(45) Date of Patent: Oct. 5, 2010

(54) METHOD FOR DETERMINING THE CYLINDER INTERIOR PRESSURE OF AN INTERNAL COMBUSTION ENGINE

(75) Inventors: Malte Koeller, Ribnitz-Damgarten (DE); Ulf Lezius, Leiferde (DE); Olaf Magnor, Braunschweig (DE); Michael Schnaubelt, Gifhorn (DE); Matthias Schultalbers, Meinersen (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 339 days.

(21) Appl. No.: 11/983,315

(22) Filed: Nov. 8, 2007

(65) Prior Publication Data

US 2008/0105233 A1    May 8, 2008

(30) Foreign Application Priority Data

Nov. 8, 2006    (DE)    ................ 10 2006 053 255

(51) Int. Cl.
G05D 16/02    (2006.01)
G05D 16/10    (2006.01)
G06F 7/78    (2006.01)
G06F 19/00    (2006.01)
F02M 7/28    (2006.01)
F02M 7/00    (2006.01)

(52) U.S. Cl. ............... 701/103; 123/435; 701/111; 703/8

(58) Field of Classification Search ........... 123/436, 123/435; 703/8, 9; 73/114.16, 114.17, 114.22, 73/114.25, 114.11, 862.08; 701/106, 111, 701/114, 115

See application file for complete search history.

(56) References Cited

U.S. PATENT DOCUMENTS

| | | | |
|---|---|---|---|
| 5,546,793 A * | 8/1996 | Gimmler et al. | 73/114.15 |
| 6,223,120 B1 * | 4/2001 | Williams | 701/111 |
| 6,336,070 B1 * | 1/2002 | Lorenz et al. | 701/102 |
| 6,714,852 B1 * | 3/2004 | Lorenz et al. | 701/102 |
| 6,993,427 B2 | 1/2006 | Ueda | |
| 7,171,950 B2 * | 2/2007 | Palma et al. | 123/435 |
| 7,292,926 B2 * | 11/2007 | Schmidt et al. | 701/101 |

(Continued)

FOREIGN PATENT DOCUMENTS

DE    44 45 684 A1    6/1996

(Continued)

OTHER PUBLICATIONS

Chen S.X., Moskwa J.J., Application of Nonlinear Sliding-Mode Observers for Cylinder Pressure Reconstruction, 1997, Elsevier Science Ltd.*

Primary Examiner—Stephen K Cronin
Assistant Examiner—Raza Najmuddin
(74) Attorney, Agent, or Firm—Collard & Roe, P.C.

(57) ABSTRACT

A method for estimating the cylinder interior pressure of an internal combustion engine from a cylinder pressure model having at least the input variables load, speed of rotation, and crank angle ($P_{pressure\ model}$), which forms the cylinder interior pressure ($P_{gas}$) to be determined, corrected by a pressure correction value ($\Delta P_{gas}$). The pressure correction value ($\Delta P_{gas}$) is determined from an observation of the alternating moments at the crankshaft. The modeled value of the cylinder interior pressure from the pressure model is obtained as a pre-control value, and corrected with a correction value formed from the measured value of the non-uniformity of rotation.

6 Claims, 1 Drawing Sheet

U.S. PATENT DOCUMENTS

| | | | |
|---|---|---|---|
| 7,455,047 B2 * | 11/2008 | Hashizume et al. | 123/435 |
| 7,509,932 B2 * | 3/2009 | Hara et al. | 123/90.15 |
| 2004/0112329 A1 * | 6/2004 | Coleman et al. | 123/305 |
| 2006/0142929 A1 | 6/2006 | Schmidt et al. | |
| 2007/0028890 A1 * | 2/2007 | Brown et al. | 123/299 |

FOREIGN PATENT DOCUMENTS

| | | |
|---|---|---|
| DE | 199 31 985 A1 | 1/2001 |
| DE | 103 40 439 | 4/2004 |
| DE | 102 56 106 A1 | 6/2004 |
| DE | 202 21 375 U1 | 11/2005 |
| EP | 1 582 717 | 10/2005 |
| WO | WO 93/22648 A1 | 11/1993 |

* cited by examiner

METHOD FOR DETERMINING THE CYLINDER INTERIOR PRESSURE OF AN INTERNAL COMBUSTION ENGINE

CROSS REFERENCE TO RELATED APPLICATIONS D

Applicants claim priority under 35 U.S.C. §119 of German Application No. 10 2006 053 255.4 filed on Nov. 8, 2006.

BACKGROUND OF THE INVENTION

1. Field of the Invention

The invention relates to a method for determining the cylinder interior pressure of an internal combustion engine.

2. The Prior Art

Interior pressure of the cylinder is a decisive variable for assessing a combustion process. This also holds true for combustion processes in which a homogeneously pre-mixed fuel/gas mixture is ignited by auto ignition. This combustion process is frequently referred to as HCCI (homogeneous charge compression ignition), homogeneous compression ignition, homogeneous auto-ignition, or, for example for gasoline as the fuel of homogeneous compression ignition, as CAI, controlled auto ignition. In order to achieve homogeneous compression ignition, a sufficiently high energy level must be present in the cylinder. This can be brought about, for example, by a high compression pressure and/or by means of a sufficient amount of hot residual gas.

Control of the parameters that influence auto ignition, such as compression, exhaust gas reflux rate, injection time, fuel distribution, air filling, etc., is very complex. In this connection, setting variables can be the control of inlet and outlet valves of the internal combustion engine, for example, which can be variably controlled with regard to their stroke and their on time. Both the compression and the exhaust gas reflux rate, in the case of internal exhaust gas reflux, can be influenced by variable on times. Additional influence parameters can be the setting of an exhaust gas reflux valve, an adjustable compression ratio, or the injection parameters. In this connection, the operating mode of homogeneous auto ignition cannot be represented in all operating points, but rather these are mostly limited to the range of partial load. It is difficult to manage the process, particularly in the marginal ranges and at dynamic operating transitions. Because of the leanness in the case of homogeneous auto ignition, the torque that can be given off is limited, and there is the risk of combustion failures. Enrichment of the mixture to increase the torque that can be given off leads out of the range of homogeneous auto ignition. Furthermore, it is problematic that a drastic increase in the cylinder pressure gradient can be seen at the rich limit of the process, which increase can bring about damage to the internal combustion engine. Furthermore, a severe cylinder pressure gradient has effects on the acoustics of the internal combustion engine. It is therefore necessary to observe the cylinder interior pressure, particularly for the control of an internal combustion engine operated with homogeneous auto ignition, for safety aspects, and this is furthermore suggested for monitoring and control of the combustion process.

Direct measurement of the cylinder interior pressure can take place with additional sensor systems, whereby cylinder pressure sensors are complicated and expensive for standard applications. Measurement devices for direct measurement of the cylinder pressure are therefore not installed in standard vehicles. This results in the need to calculate the cylinder interior pressure from other variables that can easily be measured or are already available in the control device. The non-uniformity of rotation of the crankshaft offers an approach for calculating the cylinder interior pressure; it can be measured by measuring the differences in speed of rotation and the derived angular velocity and angular acceleration at the crankshaft, by the angle mark transducer installed in standard vehicles.

A method for determining the torque of internal combustion engines is previously known from DE 44 45 684 A1. Proceeding from a precise measurement of the angular velocity or angular acceleration, the torque that is given off is determined by the torque balance at the crankshaft. In this connection, determination of the torque takes place under simplified conditions.

Furthermore, a method for determining the indicated torque from the angular velocity or acceleration of the crankshaft and determining the torque sum from the free torque and the mass torque of the oscillating masses is described in German Patent No. DE 199 31 985 A1.

German Patent No. DE 102 56 106 A1 describes carrying out compensation of the rotary sensor error or of the influence of the charging pressure, in order to improve the accuracy of the calculation of the torque.

Determining the torque from the angular velocity measurement is described in International Application No. WO 93/22648 A1, which teaches that internal rotational vibrations of the drive train can be modeled as elastically connected individual masses, which makes measurement of each of the angular velocities of the individual masses necessary. However, this is possible, in the drive train, only with additional sensor systems.

SUMMARY OF THE INVENTION

It is therefore an object of the invention to provide a method for determining the cylinder interior pressure of an internal combustion engine that is very precise with regard to the calculations.

This task is accomplished according to the invention, by a method for determining the cylinder interior pressure ($P_{gas}$) of an internal combustion engine from a cylinder pressure model having at least the input variables load, speed of rotation, and crank angle, in which a crank-angle-dependent pressure value in the cylinder. ($P_{pressure\ model}$) is calculated, which forms the cylinder interior pressure ($P_{gas}$) when corrected with a pressure correction value ($\Delta P_{gas}$). The pressure correction value ($\Delta P_{gas}$) is formed from an observation of the alternating moments at the crankshaft, in that:

a gas alternating moment $\tilde{M}_{G\_pressure\ model}$ that occurs at the crankshaft and is calculated on the basis of the cylinder interior pressure ($P_{gas}$) is formed from the modeled cylinder interior pressure ($P_{gas}$) as the input variable of a model of the crank drive, the alternating component of the gas moment ($\tilde{M}_G$) is calculated according to $$\tilde{M}_G = J(\varphi)\ddot{\varphi}_{KW,meas} + \frac{1}{2}\frac{dJ(\varphi)}{d\varphi}\dot{\varphi}^2_{KW,meas},$$

from the non-uniformity of rotation, by means of calculating the crank-angle-dependent moment of inertia ($J(\varphi)$) and the measured angular velocity ($\dot{\varphi}_{KW,meas}$) as well as the angular acceleration ($\ddot{\varphi}_{KW,meas}$) at the crankshaft, and the correction value ($\Delta P_{gas}$) is determined from the difference of the gas alternating moment from the pressure model $\overline{M}_{G\_pressure\ model}$ and the alternating component of the gas moment ($\tilde{M}_G$), from the non-uniformity of rotation.

Determination of the cylinder interior pressure of an internal combustion engine takes place in an advantageous manner, according to the invention, from a combustion chamber pressure model and a pressure correction value, which is formed from a comparison of the gas alternating moment at the crankshaft, formed by way of the cylinder pressure, and a gas alternating moment calculated by way of the measured values for angular velocity $\dot{\varphi}_{KW,meas}$ and angular acceleration $\ddot{\varphi}_{KW,meas}$. It is advantageous, according to the invention, that the modeled value of the cylinder interior pressure is obtained from a pressure model, as a pre-control value, and corrected with a correction value formed from the non-uniformity of rotation and thus from real measurement values. The basis of the comparison is the gas alternating moment. This is calculated once from the pressure that engages on the piston and results from the combustion, by way of the pressure model and a subsequent crank drive model.

Parallel to this, the alternating component of the gas moment is calculated from the measured values for non-uniformity of rotation, and compared with the values derived from the pressure model. It is advantageous, according to the invention, that the difference in the alternating component formed from different input variables is used to correct the pressure value from the pressure model. This can take place by an observer structure that contains an inverse pressure model of the combustion chamber.

The combustion chamber pressure determined is used to control the combustion process, so that severe pressure gradients that would damage the internal combustion engine can be avoided. Furthermore, a restriction is necessary for reasons of acoustics. Furthermore, the combustion chamber pressure is a parameter for a switch in operating mode, such as with engines operated with gasoline, from a conventional operating mode into an operating mode with auto ignition.

With this, it is possible to calculate the cylinder interior pressure from the control device variables, without a direct pressure measurement, and only measurement variables that are already present in standard vehicles, i.e. their control devices, are utilized.

BRIEF DESCRIPTION OF THE DRAWINGS

In the following, the invention will be described in greater detail using an exemplary embodiment. Advantageous effects are furthermore evident from the dependent claims.

In the drawings.

DETAILED DESCRIPTION OF THE EMBODIMENTS

Figure 1:
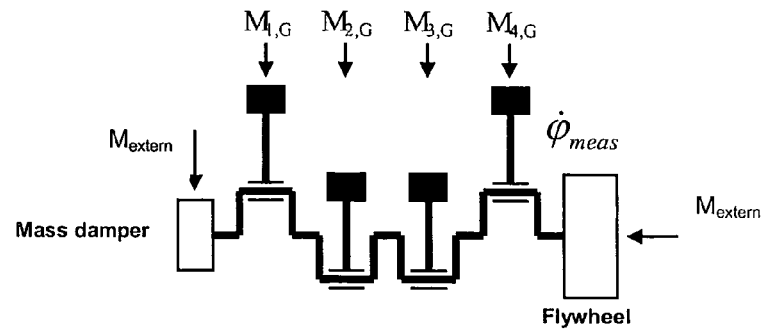
FIG. 1 shows a fundamental representation of a crank drive with the internal and external moments that engage on it.

The determination of the gas alternating moment of an internal combustion engine, in other words of the component of the pressure variations that result from combustion, is possible, indirectly, from the movement of the crankshaft. A sensor system is installed in standard vehicles, in which a measurement of the crank angular position $\varphi_{KW}$ takes place, in most cases by way of rotary sensors having a plurality of increments that are scanned by a sensor, and the movement data obtained are compared with the measured values $\dot{\varphi}_{KW,meas}$ and $\ddot{\varphi}_{KW,meas}$ the time progression—angular velocity $\dot{\varphi}$, or angular acceleration $\ddot{\varphi}$.

In this connection, the torque can be determined on the basis of the angular velocity, as described in the publication "*Drehmomentenbestimmung bei Verbrennungsmotoren durch Auswertung der Kurbelwellengeschwindigkeit*" [Determination of torque in internal combustion engines by means of evaluation of the crankshaft speed] by Fehrenbach, W. Held, and F. Zuther, in *MTZ Motorentechnische Zeitschrift* May 1998. The calculation is based on the torque balance at the crankshaft $$J \cdot \ddot{\varphi}_{KW} + 1/2 \frac{dJ(\varphi)}{d\varphi} \cdot \dot{\varphi}_{KW}^2 = \overline{M}_G - \tilde{M}_G - \overline{M}_R - \overline{M}_L \qquad \text{Equ. (1)}$$

where:

J is the moment of inertia of the crank drive, $$-\frac{dJ(\varphi)}{d\varphi}$$

is the first derivation of the moment of inertia after the crankshaft, $\dot{\varphi}_{KW}$ is the angular velocity at the crankshaft,
$\ddot{\varphi}_{KW}$ is the angular acceleration of the crankshaft,
$\overline{M}_G$ is the unchanging component of the gas moment,
$\overline{M}_R$ is the friction torque,
$\overline{M}_L$ is the load moment at the crankshaft,
$\tilde{M}_G$ is the alternating component of the gas moment.

The angular velocity $\dot{\varphi}$ or angular acceleration $\ddot{\varphi}$ can be measured on the basis of the measurement at the crankshaft, whereby the measured values will be designated with the subscript "meas" in the following ($\dot{\varphi}_{KW,meas}$, $\ddot{\varphi}_{KW,meas}$ etc.

In the stationary case, at which load and speed of rotation are constant, the unchanging components of the gas moment $\overline{M}_G$, and the unchanging components of the friction torque $\overline{M}_R$ and of the load moment at the crankshaft $\overline{M}_L$ are in equilibrium, so that Equation (1) is simplified and the alternating component of the gas moment turns out to be $$\tilde{M}_G = J(\varphi) \cdot \ddot{\varphi}_{KW,meas} + \frac{1}{2} \frac{dJ(\varphi)}{d\varphi} \cdot \dot{\varphi}_{KW,meas}^2 \qquad \text{Equ. (2)}$$

In this connection, the progression of the alternating component of the gas moment is characteristic for the torque that is given off, and therefore also for the cylinder pressure that results from combustion. In this connection, the sum of the external alternating moments that is superimposed on the drive train can be subtracted, as in DE 10 2006 003 264 A1, to increase the accuracy, so that the alternating component of the gas moment $\tilde{M}_G$ results from $$\tilde{M}_G = J(\varphi) \ddot{\varphi}_{KW,meas} + \frac{1}{2} \frac{dJ(\varphi)}{d\varphi} \dot{\varphi}_{KW,meas}^2 - \sum \overline{M}_{[extern]}.$$

FIG. 1 shows a fundamental representation of a crank drive with the internal and external moments that engage on it. Four pistons act on a crankshaft, whereby each applies a sum gas moment $M_{1-4,G}$ on the crankshaft (internal moments). An incremental transducer, not shown, is implemented, preferably on the flywheel, which measures the rotational movement of the crankshaft together with a related sensor. In this connection, additional, external moments $M_{extern}$ engage on the crankshaft, which can be taken into consideration in the calculation of the alternating component of the gas moment $\tilde{M}_G$.

Figure 2:
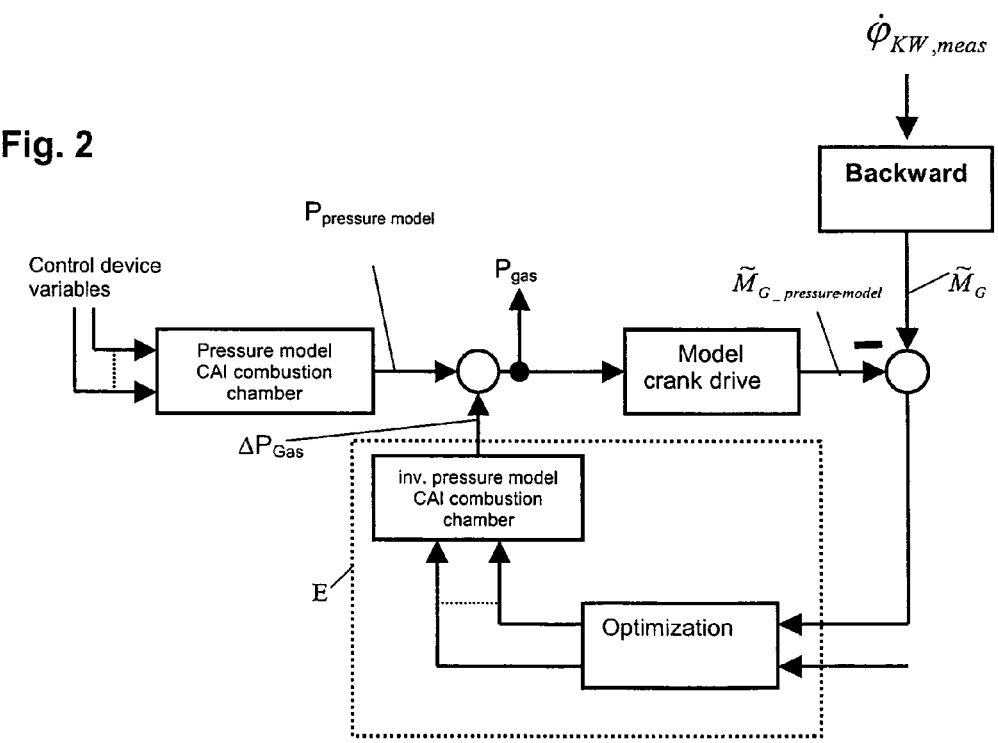
FIG. 2 shows the model structure according to the invention for calculating a cylinder interior pressure $P_{gas}$.

FIG. 2 shows the model structure according to the invention for calculating a cylinder interior pressure $P_{gas}$. In this connection, input variables of a pressure model for a CAI combustion chamber are measurement variables or model variables available in the control device. In this connection, the pressure model can be formed by a suitable model structure, for example a fractal combustion chamber model. Such a model is presented in SAE 2005-01-1120, 2005, "Validation of a Fractal Combustion Model through Flame Imaging," by Bozza, F., Gimelli, A., Merola, S. S., Vaglieco, B. M. This model is formed for an advancing flame front and is adapted for CA operation, for homogeneous compression ignition. Another possibility is presented by characteristic fields parameterized in test bench operation. The input variables for this are at least the crank angle, the suction pipe pressure as the load equivalent, and the speed of rotation of the internal combustion engine. A first modeled crank-angle-dependent pressure $P_{pressure\ model}$ is available at the output of the pressure model CAI combustion chamber, which pressure is corrected by a pressure correction value $\Delta P_{gas}$ to obtain the desired modeled cylinder interior pressure $P_{gas}$. The pressure correction value $\Delta P_{gas}$ is derived from an observer structure B. To form the pressure correction value $\Delta P_{gas}$, the cylinder interior pressure $P_{gas}$ is applied to a model of the crank drive as an input variable. The crank drive model contains the known geometrical crank-angle-dependent assignments of the piston to the crankshaft, by way of the connecting rod, and a gas alternating moment $\tilde{M}_{G\_pressure\ model}$ can be calculated from the crank-angle-dependent modeled cylinder interior pressure $P_{gas}$, since it is derived from the latter. This value is subtracted from the alternating component of the gas moment, which is calculated from the measured values for the angular velocity $\dot{\varphi}_{KW,meas}$ and the angular acceleration $\ddot{\varphi}_{KW,meas}$—see Equation 2—by way of the non-uniformity of rotation. This modeling is referred to as backward modeling, since it calculates back from the result—the non-uniformity of rotation—to the cause—the alternating component of the gas moment. The deviation is the input variable of the observer B, whereby here, the inaccuracy, i.e. the deviation of the modeled cylinder interior pressure $P_{gas}$ from the real combustion chamber pressure, is reflected.

An adaptation of the pressure model CAI combustion chamber and calculation of the pressure correction value $\Delta P_{gas}$ take place on the basis of an optimization. Additional input variables E, which characterize operating or status variables of the internal combustion engine, for example crank angle, load, and speed of rotation, can be applied to the observer. The observer receives an inverse model of the CAI pressure model, the parameters of which are adapted on the basis of the deviation.

Accordingly, while only a few embodiments of the present invention have been shown and described, it is obvious that many changes and modifications may be made thereunto without departing from the spirit and scope of the claims.

REFERENCE SYMBOL LIST $J(\varphi)$ crank-angle-dependent mass inertia moment
$\varphi_{KW}$ angular position of the crankshaft (in general)
$\varphi_{KW,meas}$ measured angular position of the crankshaft
$\dot{\varphi}_{KW,meas}$ measured angular velocity at the crankshaft
$\ddot{\varphi}_{KW,meas}$ measured angular acceleration at the crankshaft
$\tilde{M}_G$ alternating component of the gas moment, calculated from the non-uniformity of rotation
$\tilde{M}_{G\_pressure\ model}$ gas alternating moment, calculated from the pressure model
$\overline{M}_G$ unchanging component of the gas moment
$\overline{M}_R$ friction torque
$\overline{M}_L$ load moment at the crankshaft
$\Sigma \overline{M}_{extern}$ sum of the external moments
$M_{gas}$ sum gas moment
$P_{pressure\ model}$ modeled cylinder interior pressure
$\Delta P_{gas}$ pressure correction value
$P_{gas}$ cylinder interior pressure corrected by $P_{pressure\ model} - \Delta P_{gas}$
E additional input variables

What is claimed is:

1. A method for determining cylinder interior pressure ($P_{gas}$) of an internal combustion engine from a cylinder pressure model having input variables comprising at least load, speed of rotation and crank angle, the method comprising the following steps:
   calculating a crank-angle-dependent pressure value in the cylinder ($P_{pressure\ model}$), which forms a cylinder interior pressure ($P_{gas}$) when corrected with a pressure correction value ($\Delta P_{gas}$), said pressure correction value ($\Delta P_{gas}$) being formed from an observation of alternating moments at a crankshaft;
   calculating a gas alternating moment $\tilde{M}_{G\_pressure\ model}$ that occurs at the crankshaft, on the basis of the cylinder interior pressure ($P_{gas}$), said gas alternating moment being formed from a modeled cylinder interior pressure ($P_{gas}$) as the input variable of a model of a crank drive;
   calculating an alternating component of the gas moment ($\tilde{M}_G$) according to $$\tilde{M}_G = J(\varphi)\ddot{\varphi}_{KW,meas} + \frac{1}{2}\frac{dJ(\varphi)}{d\varphi}\dot{\varphi}^2_{KW,meas},$$

from non-uniformity of rotation, by means of calculating a crank-angle-dependent moment of inertia ($J(\varphi)$) and a measured angular velocity ($\dot{\varphi}_{KW,meas}$) as well as an angular acceleration ($\ddot{\varphi}_{KW,meas}$) at the crankshaft; and
   determining a correction value ($\Delta P_{gas}$) from a difference of the gas alternating moment from a pressure model $\tilde{M}_{G\_pressure\ model}$ and the alternating component of the gas moment ($\tilde{M}_G$), from non-uniformity of rotation.

2. A method according to claim 1, wherein the difference of the gas alternating moment ($\tilde{M}_{G\_pressure\ model}$) from the pressure model and the alternating component of the gas moment ($\tilde{M}_G$) from the non-uniformity of rotation is applied to an observer structure (B) that contains an inverse pressure model of the combustion chamber, and wherein the pressure model is adapted on the basis of the difference that is determined.

3. A method according to claim 1, wherein the gas alternating moment ($\tilde{M}_{G\_pressure\ model}$) derived from the pressure model, which engages on the crankshaft, is determined with the modeled cylinder interior pressure ($P_{gas}$), on the basis of known geometric relationships of a piston on the crankshaft, by way of a connecting rod, and with a known moment of inertia of the crankshaft.

4. A method according to claim 1, wherein the modeled cylinder interior pressure ($P_{gas}$) is used to assess a combustion process and as an input variable of a combustion process control.

5. A method according to claim 4, wherein the modeled cylinder interior pressure ($P_{gas}$) is used to assess a process limit of an internal combustion engine operated with homogeneous compression ignition, wherein a departure from an operating mode of "homogeneous compression ignition" is recognized by a disproportional increase in a combustion chamber pressure gradient when a fuel/gas mixture becomes richer.

6. A method according to claim 5, wherein the pressure gradients that are determined are compared with a threshold value, and if this threshold value is exceeded, a reduction in the amount of fuel or a switch to a different mode of operation takes place.

* * * * *